(12) United States Patent
Umarjee et al.

(10) Patent No.: US 12,360,855 B1
(45) Date of Patent: Jul. 15, 2025

(54) SYSTEMS AND METHODS FOR PROTECTING DATA

(71) Applicant: Veritas Technologies LLC, Santa Clara, CA (US)

(72) Inventors: Shilpa Umarjee, Pune (IN); Vaijayanti Bharadwaj, Pune (IN); Chirag Dalal, Pune (IN)

(73) Assignee: Cohesity, Inc., Santa Clara, CA (US)

( * ) Notice: Subject to any disclaimer, the term of this patent is extended or adjusted under 35 U.S.C. 154(b) by 456 days.

(21) Appl. No.: 16/867,499

(22) Filed: May 5, 2020

(51) Int. Cl.
*G06F 11/14* (2006.01)
*G06F 9/455* (2018.01)

(52) U.S. Cl.
CPC ...... *G06F 11/1464* (2013.01); *G06F 9/45558* (2013.01); *G06F 11/1451* (2013.01); *G06F 2009/45583* (2013.01); *G06F 2009/45595* (2013.01); *G06F 2201/84* (2013.01)

(58) Field of Classification Search
CPC ............ G06F 11/1464; G06F 9/45558; G06F 11/1451; G06F 2009/45583; G06F 2009/45595; G06F 2201/84
See application file for complete search history.

(56) References Cited

U.S. PATENT DOCUMENTS

| | | | |
|---|---|---|---|
| 9,946,603 B1 * | 4/2018 | Kumar | G06F 11/1451 |
| 2009/0182784 A1 * | 7/2009 | Rohit | G06F 11/1471 |
| 2013/0159249 A1 * | 6/2013 | Dewall | G06F 16/2379 |
| | | | 707/610 |
| 2020/0349029 A1 * | 11/2020 | Meadowcroft | G06F 11/1466 |
| 2020/0356442 A1 * | 11/2020 | Agarwal | G06F 16/1734 |

* cited by examiner

*Primary Examiner* — Tony Wu
(74) *Attorney, Agent, or Firm* — Greenberg Traurig, LLP (57) ABSTRACT

The disclosed computer-implemented method for protecting data may include (i) detecting that a data storage protection protocol for backing up a virtual machine is switching from a hypervisor native snapshot solution to a continuous data protection solution, (ii) toggling, at a specific toggling time, an input/output tap to switch to the continuous data protection solution, (iii) capturing, at a specific snapshot time and in response to switching to the continuous data protection solution, an incremental snapshot that includes differences in the virtual machine between a last snapshot captured prior to the specific toggling time and the specific snapshot time, and (iv) generating a synthetic snapshot based on a combination of the incremental snapshot captured at the specific snapshot time and a set of at least one snapshot taken prior to the specific toggling time. Various other methods, systems, and computer-readable media are also disclosed.

20 Claims, 5 Drawing Sheets

SYSTEMS AND METHODS FOR PROTECTING DATA

BACKGROUND

By way of background, related systems may perform backups using hypervisor native snapshots. One illustrative example of such hypervisor native snapshots may include VMware snapshots. Backup schedules may include full backups and incremental backups. A continuous data protection solution for such a system may intercept every write operation to one or more virtual disks of a corresponding virtual machine, thereby protecting the virtual machine. The continuous data protection solution does not necessarily rely on hypervisor native snapshots.

In view of the above, one complication may be that, when the data protection system switches from the snapshot-based solution to the continuous data protection solution, a full backup may be requested or required in order to successfully switch to the continuous data protection point of view as a "base" copy of the virtual machine. Incremental backups can then be performed through the continuous data protection solution. A virtual machine that has virtual disks that run on the order of terabytes may request a significant amount of time and software resources in order to perform the full backup. The instant disclosure, therefore, identifies and addresses a need for systems and methods for protecting data.

SUMMARY

As will be described in greater detail below, the instant disclosure describes various systems and methods for protecting data. In one example, a computer-implemented method may include (i) detecting that a data storage protection protocol for backing up a virtual machine is switching from a hypervisor native snapshot solution to a continuous data protection solution, (ii) toggling, at a specific toggling time, an input/output tap to switch to the continuous data protection solution, (iii) capturing, at a specific snapshot time and in response to switching to the continuous data protection solution, an incremental snapshot that includes differences in the virtual machine between a last snapshot captured prior to the specific toggling time and the specific snapshot time, and (iv) generating a synthetic snapshot based on a combination of the incremental snapshot captured at the specific snapshot time and a set of at least one snapshot taken prior to the specific toggling time.

In one example, the continuous data protection solution utilizes the input/output tap to send input/output operations to a gateway. In further examples, the gateway creates the synthetic snapshot. In additional examples, the gateway sends the synthetic snapshot to a media server.

Additionally, in some examples, the input/output tap begins transmitting, at the specific toggling time, new data written to the virtual machine after the specific toggling time. In further examples, the input/output tap transmits the new data written to the virtual machine without transmitting full data corresponding to a full backup taken prior to the specific toggling time.

In additional examples, generating the synthetic snapshot based on the combination of the incremental snapshot captured at the specific snapshot time and the set of at least one snapshot taken prior to the specific toggling time eliminates a requirement to perform a full backup as a condition to switch to the continuous data protection solution. In further examples, the set of at least one snapshot taken prior to the specific toggling time includes at least one full backup. In even further examples, the set of at least one snapshot taken prior to the specific toggling time includes at least one full backup and at least one incremental backup. And in some examples, generating a synthetic snapshot comprises the hypervisor native snapshot solution querying the continuous data protection solution whether the continuous data protection solution already possesses a set of incremental changes to the virtual machine.

In one embodiment, a system for implementing the above-described method may include (i) a detection module, stored in memory, that detects that a data storage protection protocol for backing up a virtual machine is switching from a hypervisor native snapshot solution to a continuous data protection solution, (ii) a toggling module, stored in memory, that toggles, at a specific toggling time, an input/output tap to switch to the continuous data protection solution, (iii) a capturing module, stored in memory, that captures, at a specific snapshot time and in response to switching to the continuous data protection solution, an incremental snapshot that includes differences in the virtual machine between a last snapshot captured prior to the specific toggling time and the specific snapshot time, (iv) a generation module, stored in memory, that generates a synthetic snapshot based on a combination of the incremental snapshot captured at the specific snapshot time and a set of at least one snapshot taken prior to the specific toggling time, and (v) at least one physical processor configured to execute the detection module, the toggling module, the capturing module, and the generation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect that a data storage protection protocol for backing up a virtual machine is switching from a hypervisor native snapshot solution to a continuous data protection solution, (ii) toggle, at a specific toggling time, an input/output tap to switch to the continuous data protection solution, (iii) capture, at a specific snapshot time and in response to switching to the continuous data protection solution, an incremental snapshot that includes differences in the virtual machine between a last snapshot captured prior to the specific toggling time and the specific snapshot time, and (iv) generate a synthetic snapshot based on a combination of the incremental snapshot captured at the specific snapshot time and a set of at least one snapshot taken prior to the specific toggling time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting data. Generally speaking, the subject matter of this application may improve upon related systems that enable a protection or replication protocol that is protecting a data set, such as a virtual disk for a virtual machine, to successfully switch from a snapshot solution (e.g., a hypervisor native snapshot solution) to a continuous data protection solution, and furthermore may enable the switch to be completed without performing a tedious and cumbersome full backup operation at the source. Instead, the disclosed subject matter may leverage one or more pre-existing snapshots, while also tracking the timing of turning on an input/output tap (e.g., a specific toggling time) and/or a timing of capturing an additional incremental snapshot (e.g., after the specific toggling time), such that one or more modules may successfully construct a synthetic snapshot using the one or more pre-existing snapshots, in combination with the newly captured incremental snapshot, to thereby provide a point in time snapshot (e.g., the equivalent in data to the full backup), but doing so in a manner such that constructing the synthetic snapshot is much faster and more efficient than performing a full backup as in the related art.

Figure 1:
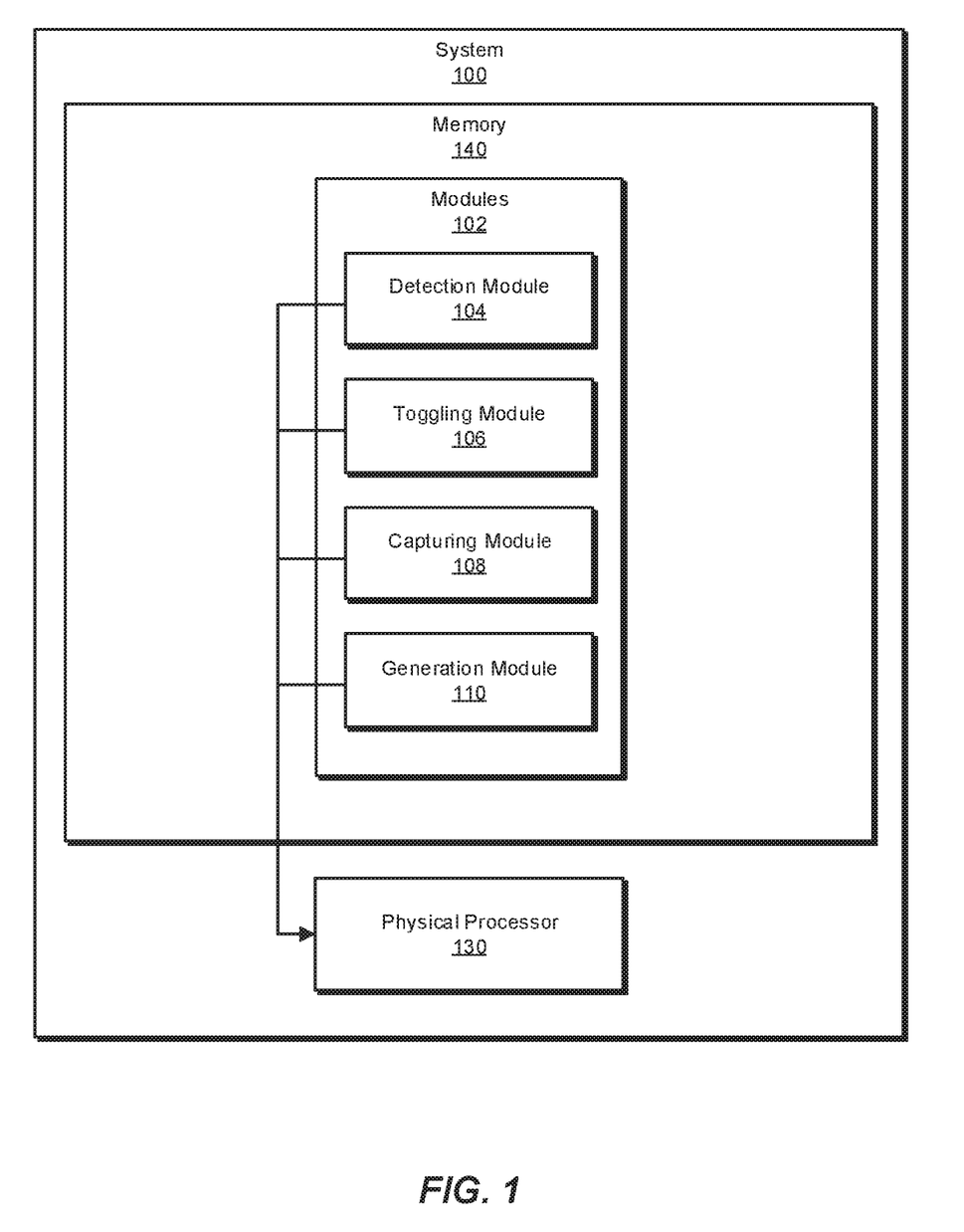
FIG. 1 is a block diagram of an example system for protecting data.
Figure 2:
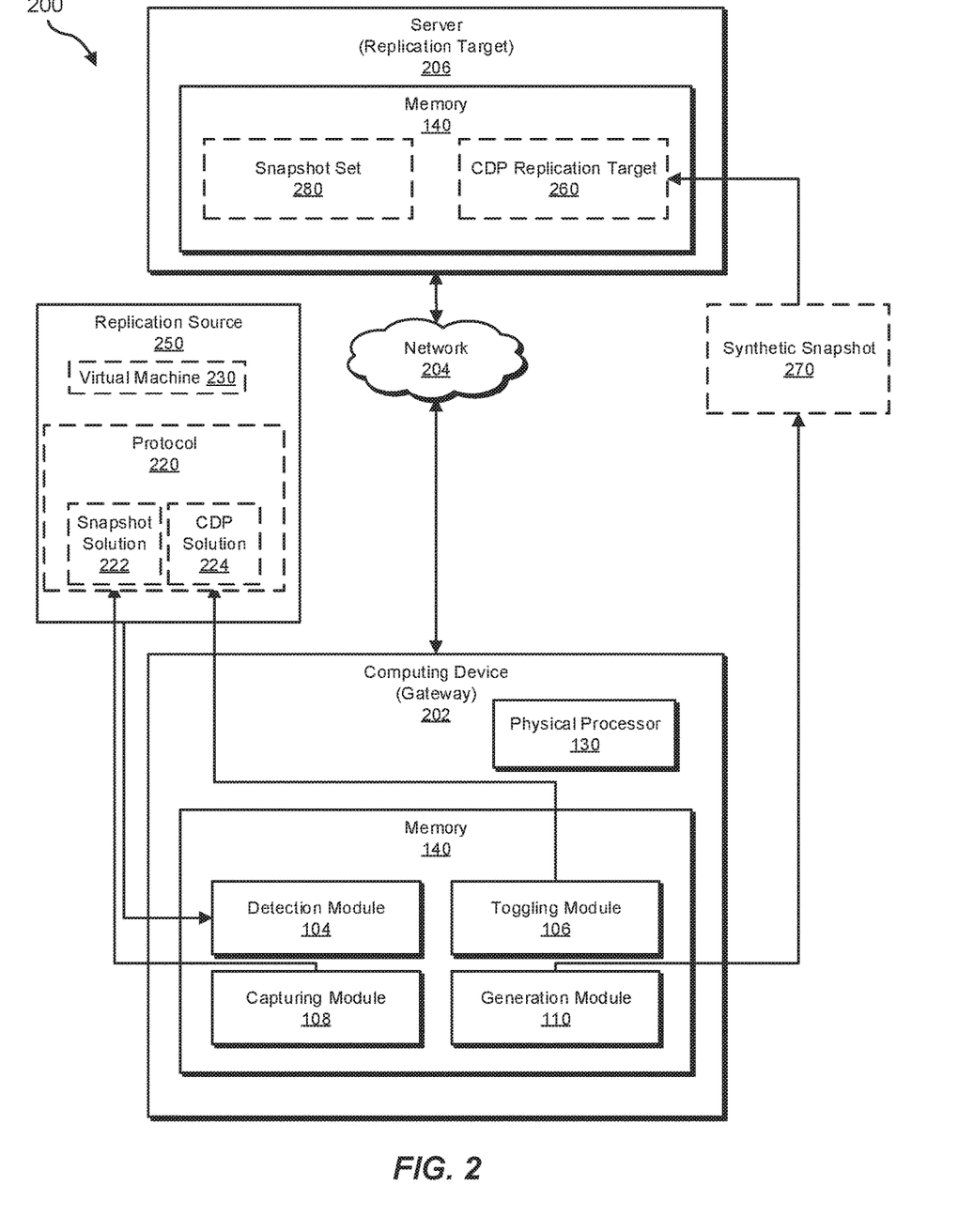
FIG. 2 is a block diagram of an additional example system for protecting data.

The following will provide, with reference to FIGS. 1-2, detailed descriptions of example systems for protecting data. Detailed descriptions of corresponding computer-implemented methods will also be provided in connection with FIGS. 3-5.

FIG. 1 is a block diagram of example system 100 for emulating local storage. As illustrated in this figure, example system 100 may include one or more modules 102 for performing one or more tasks. For example, and as will be explained in greater detail below, example system 100 may include a detection module 104, stored in memory, that detects that a data storage protection protocol for backing up a virtual machine is switching from a hypervisor native snapshot solution to a continuous data protection solution. System 100 may also include a toggling module 106, stored in memory, that toggles, at a specific toggling time, an input/output tap to switch to the continuous data protection solution. Additionally, system 100 may also include a capturing module 108, stored in memory, that captures, at a specific snapshot time and in response to switching to the continuous data protection solution, an incremental snapshot that includes differences in the virtual machine between a last snapshot captured prior to the specific toggling time and the specific snapshot time. Furthermore, system 100 may include a generation module 110, stored in memory, that generates a synthetic snapshot based on a combination of the incremental snapshot captured at the specific snapshot time and a set of at least one snapshot taken prior to the specific toggling time.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting data. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to emulate local storage.

Computing device 202 generally represents any type or form of computing device capable of reading computer-executable instructions. Illustrative examples of computing device 202 may include a client device or workstation used by, or assigned to, an employee within a corporate enterprise organization. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device, as well as gateway devices such as switches, routers, and/or other gateways.

Server 206 generally represents any type or form of computing device that is capable of performing method 300 of FIG. 3, as discussed further below, or facilitating the performance of this method. In one illustrative example, server 206 may correspond to a server of a cloud storage vendor. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
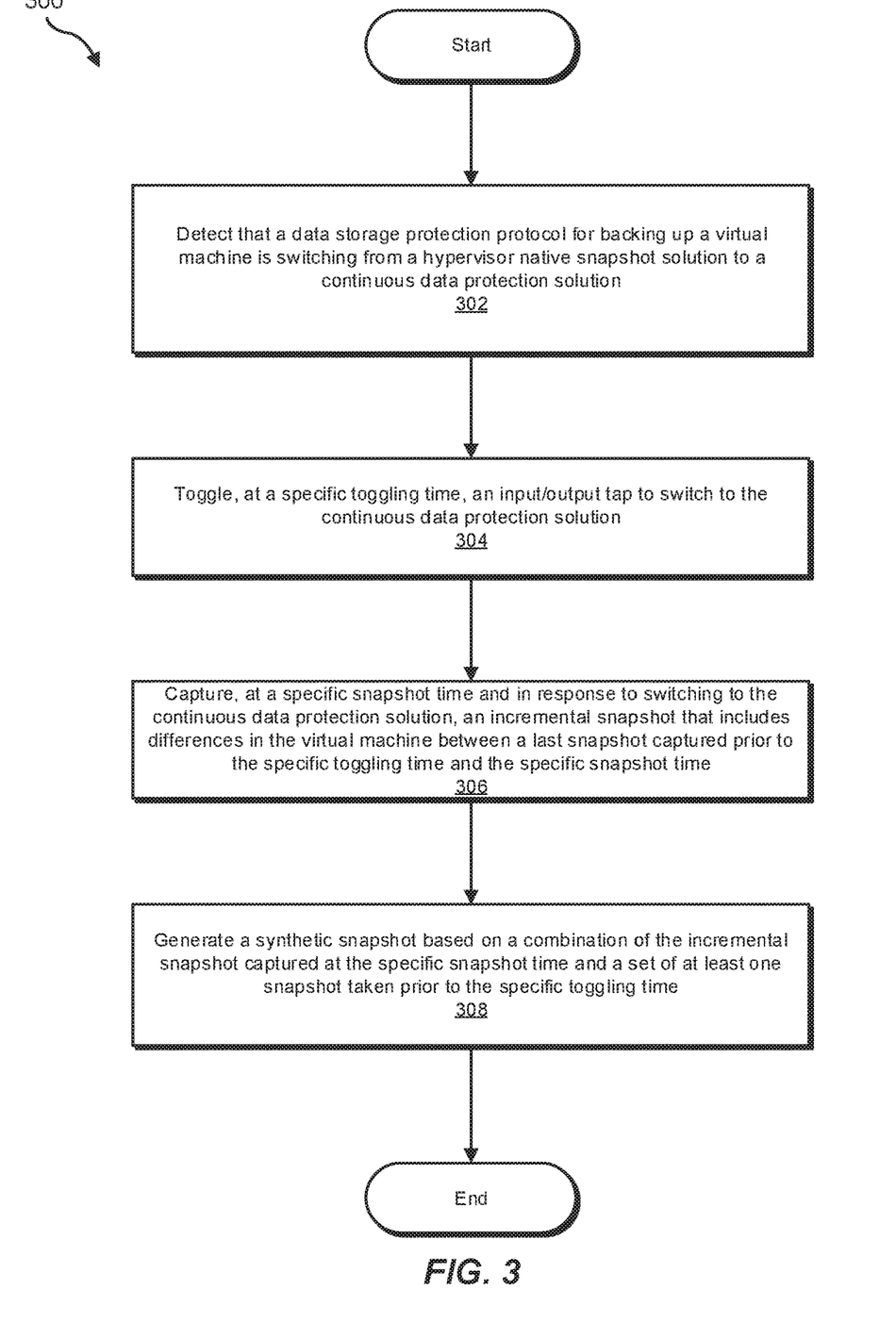
FIG. 3 is a flow diagram of an example method for protecting data.

FIG. 3 is a flow diagram of an example computer-implemented method 300 for protecting data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect that a data storage protection protocol for backing up a virtual machine is switching from a hypervisor native snapshot solution to a continuous data protection solution. For example, detection module 104 may, as part of computing device 202 in FIG. 2, detect that a data storage protection protocol 220 for backing up a virtual machine 230 within a replication source 250 is switching from a hypervisor native snapshot solution, which may correspond to snapshot solution 222 in FIG. 2, to a continuous data protection ("CDP") solution, which may correspond to a CDP solution 224 in FIG. 2. In some examples, detection module 104 may be disposed within computing device 202 and/or replication source 250 that includes virtual machine 230. In further examples, all of modules 102 may be disposed within computing device 202. In other examples, a subset of modules 102 may be disposed within computing device 202 and a remaining subset may be disposed within replication source 250, for example.

Detection module 104 may detect that the data storage protection protocol 220 is switching to the continuous data protection solution in a variety of ways. In some examples, detection module 104 may detect that a software application, a user, and/or an administrator has requested or commanded to switch to the continuous data protection solution. In other examples, detection module 104 may detect that an input/output tap, which may correspond to the continuous data protection solution, may have been turned on at a specific toggling time, which may correspond to a time T2 shown in FIGS. 4-5, and discussed in more detail below.

At step 304, one or more of the systems described herein may toggle, at a specific toggling time, an input/output tap to switch to the continuous data protection solution. For example, toggling module 106 may, as part of computing device 202 in FIG. 2, toggle an input/output tap, which may be configured as part of CDP solution 224, to switch to the continuous data protection solution.

Toggling module 106 may toggle the input/output tap in a variety of ways. In general, toggling module 106 may toggle the input/output tap by enabling the input/output tap or otherwise turning it on. Toggling module 106 may instruct the input/output tap to record each and every write operation performed on the virtual machine beginning at the time of turning on the tap.

In some examples, the continuous data protection solution may utilize the input/output tap to send input/output operations. For example, CDP solution 224 may utilize the input/output tap discussed above to send input/output operations to a gateway corresponding to computing device 202 shown in FIG. 2. In more specific examples, generation module 110 may be disposed within computing device 202 and generation module 110 may generate the synthetic snapshot in accordance with step 308, as discussed in more detail below. In these examples, the gateway corresponding to computing device 202 may also optionally send the newly generated synthetic snapshot to server 206, which may correspond to a media server. The gateway may optionally generate point-in-time snapshots using in part the input/output operations recorded by the input/output tap and transmitted to the gateway, as discussed in more detail below.

At step 306, one or more of the systems described herein may optionally capture, at a specific snapshot time and in response to switching to the continuous data protection solution, an incremental snapshot that includes differences in the virtual machine between a last snapshot captured prior to the specific toggling time and the specific snapshot time.

For example, capturing module 108 may optionally capture, at the specific snapshot time and in response to switching to the continuous data protection solution, an incremental snapshot that includes differences in virtual machine 230 between a last snapshot captured prior to the specific toggling time and the specific snapshot time.

Capturing module 108 may capture the incremental snapshot in a variety of ways. In some examples, capturing module 108 may capture the incremental snapshot by leveraging or utilizing the snapshot functionality of snapshot solution 222 (e.g., by leveraging the snapshot system that was previously used to capture pre-existing snapshots prior to the specific toggling time). Capturing module 108 may capture the incremental snapshot at least in part by (i) identifying a specific time corresponding to the specific toggling time (e.g., T2 in FIG. 4), (ii) identifying a specific time corresponding to the specific snapshot time (i.e., T3), and (iii) recording, into the incremental snapshot, differences indicating differences between times T1-T3 in the virtual machine and/or the virtual disk corresponding to the virtual machine. In these examples, the incremental snapshot previously captured at time T1 may correspond to the "last snapshot captured prior to" the toggling of the input/output tap at time T2.

In some examples, the input/output tap is configured to begin transmitting, at the specific toggling time, new data written to the virtual machine after the specific toggling time. In other words, after the input/output tap has toggled or turned on at the specific toggling time, the input/output tap may begin transmitting the new data written to virtual machine 230. The input/output tap may be configured to transmit the new data written to the virtual machine 230 without transmitting full data corresponding to a full backup taken prior to the specific toggling time. In other words, the inventive improvement of this application may enable successful switching or transition between a hypervisor native snapshot data protection solution and a continuous data protection solution, where the transition is performed without the inefficient and cumbersome condition of performing a traditional full backup (e.g., an additional full backup performed in response to initiating the transition to continuous data protection, as distinct from the original full backup performed at time T0 and prior to the decision to transition to continuous data protection). Instead, as a substitute, generation module 110 is intelligent enough to reconstruct the data corresponding to a traditional full backup (which otherwise would have been performed to complete the transition to continuous data protection in the related art) using at least one pre-existing snapshot, such as snapshot set 280, as well as one or more newly generated incremental snapshots, as discussed in connection with step 306 (or, alternatively, one or more items of information captured by the continuous data protection solution). In these examples, generating the synthetic snapshot may effectively eliminate a requirement to perform an additional full backup as a condition to switch to the continuous data protection solution.

In additional examples, the set of at least one snapshot, which may correspond to snapshot set 280 shown in FIG. 2, may include at least one full backup. The full backup may be recorded at time T0 shown in FIGS. 4 and 5. In even further examples, the set of at least one snapshot may include both a full backup (T0) and an incremental backup (T1). The incremental backup may be captured at time T1 shown in FIGS. 4 and 5, and this backup may capture changes made to the virtual machine since the time of capturing the full backup of time T0 up to time T1.

From a high level perspective, the disclosed systems and methods may operate according to at least one of two separate embodiments. A "marker" embodiment is outlined in FIG. 4. Alternatively, a "time" embodiment is outlined in FIG. 5. Both of these embodiments may be substantially the same with respect to the full backup captured at time T0, the incremental backup captured at time T1, and the specific toggling time for toggling the input/output tap for continuous data protection at time T2. Of course, between time T1 and T2, as discussed further below, an arbitrary number of additional incremental backups may have also been captured.

Figure 4:
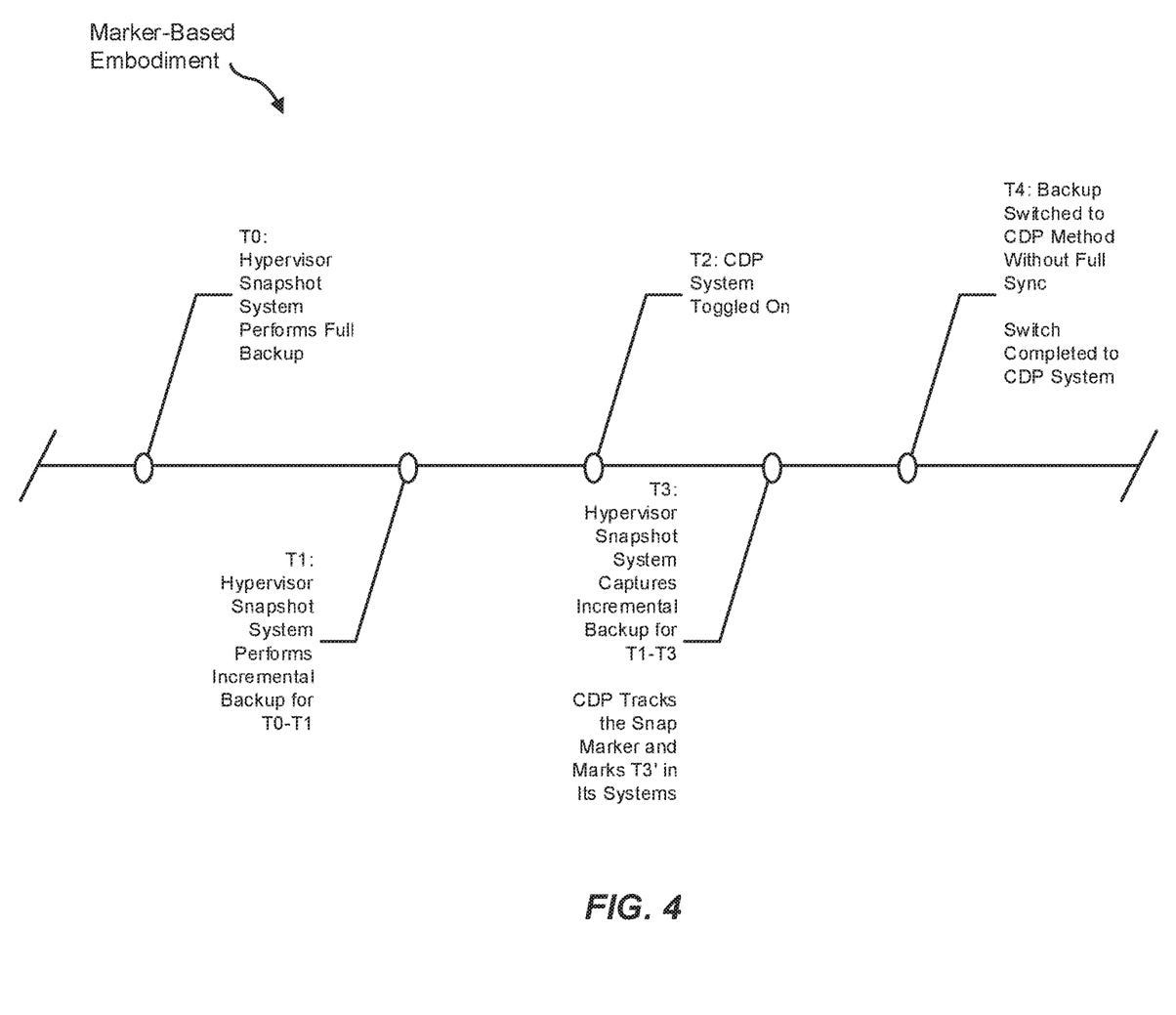
FIG. 4 is a block diagram of an example timeline.
Figure 5:
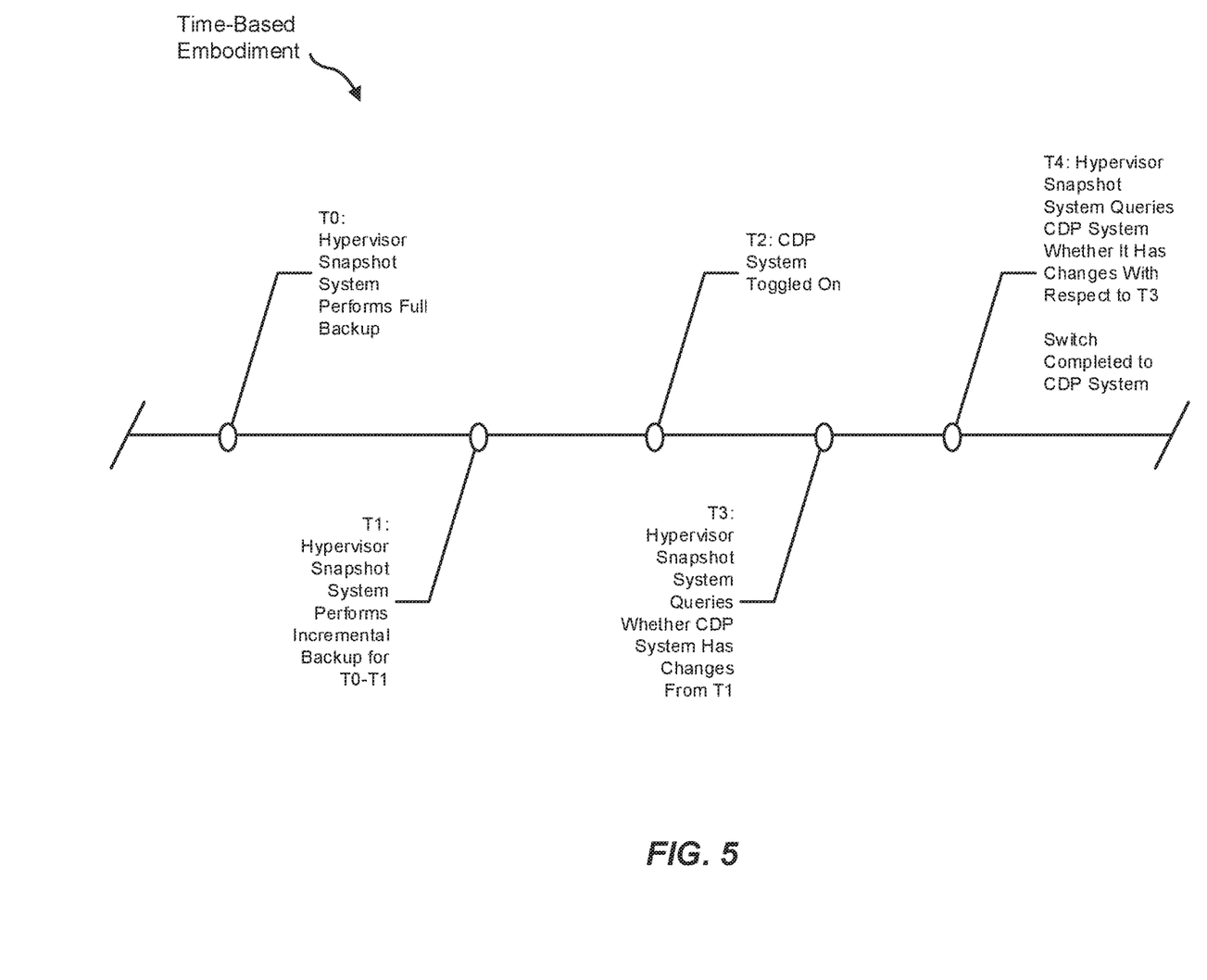
FIG. 5 is a block diagram of another example timeline.

The "marker" embodiment of FIG. 4 may differ from the "time" embodiment of FIG. 5 beginning at least at time T3. In this example, capturing module 108 may automatically capture any incremental backup that corresponds to incremental changes made between the times T1-T3. In other words, capturing module 108 may, at time T3, generate an incremental backup that keeps the corresponding backup up-to-date up to the point in time T1. In these examples, capturing module 108 may perform the capturing of the newly generated incremental backup automatically without querying CDP solution 224 to determine whether CDP solution 224 already has some or all of the data corresponding to this newly generated incremental backup (e.g., data indicating changes to the virtual machine between times T1-T3).

At essentially the same time that capturing module 108 is capturing the newly generated incremental backup discussed above, CDP solution 224 may be intelligently watching or monitoring the performance of these operations. Accordingly, CDP solution 224 may intelligently detect a specific time corresponding to time T3, which is the time that the hypervisor native snapshot solution captures the newly generated incremental backup. Furthermore, CDP solution 224 may optionally mark a time T3' within its own CDP storage system. Additionally, CDP solution 224 may synchronize time T3 (at snapshot solution 222) with time T3' (at CDP solution 224) such that CDP solution 224 knows that time T3 and T3' essentially correspond to each other. The time T3 and the time T3' may be synchronized in the sense that the last block written as part of the newly generated incremental backup at time T3 is the same as the last block written within CDP solution 224 at the time T3' marked within CDP solution 224.

Finally, at time T4 in FIG. 4, CDP solution 224 may capture a snapshot with respect to time T3'. CDP solution 224 may have previously determined that time T3 and time T3' are synchronized. Accordingly, CDP solution 224 may determine that it has sufficient information to finalize the switch to a continuous data protection solution without further utilization of hypervisor native snapshot solutions.

In contrast, FIG. 5 shows an alternative timeline according to the "time" embodiment. In this example, capturing module 108 may optionally omit the capturing of the newly generated incremental backup at time T3. Instead, capturing module 108 may query CDP solution 224 to determine whether CDP solution 224 already possesses corresponding data such that it is not necessary to newly generate such an incremental backup. In other words, capturing module 108 may query CDP solution 224 to determine whether CDP solution 224 has already captured (due, in part, to the toggling of the input/output tap at time T2) the data corresponding to the incremental backup spanning time T1-T3. In other words, if CDP solution 224 already has the entirety of this information, because no changes, or an insufficient number of changes, were made to the virtual machine during this time, and/or because the input/output tap was already turned on at time T2, then it is not necessary or desirable for capturing module 108 to newly generate such an incremental backup, which would be redundant.

Similarly, at time T4, the backup system (e.g., capturing module 108 and/or generation module 110) may query CDP solution 224 to determine whether CDP solution 224 already possesses the data corresponding to changes spanning from time T3-T4. Again, CDP solution 224 may already possess such data due to the toggling of the input/output tap at time T2. In these examples, CDP solution 224 may also optionally provide changed data spanning from time T2-T4. At this time, the capturing of one or more full backups and/or incremental snapshots according to the hypervisor native snapshot solution (e.g., snapshot solution 222) may be ended and the transition to continuous data protection may be finalized such that the transition is complete and no further snapshots are taken or desired.

At step 308, one or more of the systems described herein may generate a synthetic snapshot based on a combination of the incremental snapshot captured at the specific snapshot time and a set of at least one snapshot taken prior to the specific toggling time. For example, generation module 110 may generate a synthetic snapshot 270 based on a combination of the incremental snapshot captured at step 306 and a set of at least one snapshot, such as snapshot set 280, taken prior to the specific toggling time (which may include the snapshot for T0 and the snapshot for T1, as discussed above in connection with FIGS. 4-5). Synthetic snapshot 270 may be referenced by a CDP replication target 260, as shown in FIG. 2.

Generally speaking, generation module 110 may optionally be disposed within computing device 202, which may correspond to a gateway. Rather than performing an inefficient and cumbersome full backup process in order to finalize the transition to the continuous data protection solution, generation module 110 may instead intelligently reference one or more snapshots previously taken, by snapshot solution 222, and stored within snapshot set 280. Snapshot set 280 may include information indicating the complete state of the virtual machine at time T1 (e.g., the time of the last incremental backup performed prior to time T2). Nevertheless, snapshot set 280 may not necessarily include information indicating changes made after time T1 and before time T2. In contrast, CDP solution 224 may already possess data indicating changes made after time T2 due to the turning on of the input/output tap at time T2. Accordingly, the data storage system corresponding to method 300 may benefit from obtaining the data or missing data spanning the time T1-T2.

To obtain this information, capturing module 108 may optionally capture the newly generated incremental snapshot at time T3, and this incremental snapshot may capture changes made spanning the time T1-T2. With this missing gap data, generation module 110 may be intelligent enough to combine (A) the pre-existing snapshots recorded prior to time T2 and corresponding to snapshot set 280, (B) the newly generated incremental snapshot captured at time T3 in accordance with the "marker" embodiment of FIG. 4, and/or (C) the data captured by the input/output tap beginning at time T2. The combination of these two or three items of information may be sufficient to complete the transition to continuous data protection without performing the inefficient and cumbersome process of performing a full backup operation, analogous to the full backup operation that was previously performed at time T0. In other words, the newly generated incremental snapshot that captures changes made spanning the time T1-T3 includes two sets of changed data: (i) changed data spanning the time T1-T2, which was otherwise missing without the performance of a traditional full backup to complete the transition to continuous data protection, as discussed above, and (ii) changed data spanning the time T2-T3, which may have been previously captured by the input/output tap toggled on at time T2. Moreover, in the alternative "time" embodiment of FIG. 5, the data corresponding to item (B) above may be captured according to the methodology of this embodiment, without newly capturing an incremental snapshot at time T3, as further discussed above in connection with the alternative "time" embodiment that is shown in the timeline of FIG. 5.

The above discussion provided a general overview of the disclosed systems and methods in accordance with method 300 shown in FIG. 3. Additionally, or alternatively, the following provides some further concrete details of problems solved by one or more primary commercial embodiments of this application.

It is a common scenario that existing virtual machines are backed up using hypervisor native snapshot technologies. Some customers would like to switch to a CDP-based protection solution (like CRUISE CONTROL). The motivation for performing this may include the facts that (i) virtual machine size has generally increased, (ii) there is a desire for a low recovery point objective ("RPO"), and (iii) customers may desire to avoid the impact of the hypervisor native snapshot technology, which may be referred to as the "virtual machine stun problem."

In related systems, switching to continuous data protection for virtual machines may involve, or even require, an initial full synchronization. The initial pulse organization may be requested even if the same virtual machine has already been backed up using hypervisor native snapshot methodologies.

The scenario described above creates a potential problem whereby the switch to continuous data protection becomes intensive and slow. Additionally, a low recovery point objective starts only after a full backup has been sent to a server (e.g., corresponding to NETBACKUP). As further discussed above, and also discussed in more detail below, one potential solution to this dilemma is to leverage one or more full backups that already exist (e.g., already exist in NETBACKUP), such that the recovery point objective can remain low, and a corresponding mode may begin quickly.

The disclosed subject matter may include a method which can help achieve seamless migration of changed blocks tracking from hypervisor snapshots to an input/output tap-based CDP system. The disclosed systems and methods may leverage existing backup images on a backup service when a CDP system starts replicating data. A virtual machine may be backed up by a media server. The backup may include backup images T0 and T1. The continuous data protection system may start after time T1. The time T2 may correspond to a full backup, and the time T1 may correspond to an incremental backup. The continuous data protection system may start after time T2. The continuous data protection solution may involve an input/output tap, which may send each input/output operation on a virtual machine to a gateway. The gateway may optionally create PITs or point-in-time snapshots. The gateway may start sending these PITs to the media server. Without igniting these, some or all data would again be requested, or required, to have been sent to the media server by the gateway.

In view of the above, the following mechanism may render it unnecessary for the gateway to send some or all data again. Instead, the following mechanism may use the pre-existing T0 snapshot and T1 snapshot (e.g., pre-existing prior to a decision or initiation of the transition to continuous data protection), which are already present on the media server. The input/output tap is attached to the virtual machine at time T2. The input/output tap may start sending only new data written to the virtual machine, not full data of the virtual machine. At time T3, the mechanism may capture a snapshot and use the snapshot to send only differences between times T1-T3 to the media server. At the time the snapshot of T3 is taken, the input/output tap may optionally receive notification, and the input/output tap may send a marker to the gateway, which may write out the data as a gateway PIT T3'. The snapshots of data structures for times T3 and T3' may be synchronized in the sense that the last block written for snapshot T3 is the same as the last block written to the snapshot or PIT corresponding to time T3'.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smart watches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting data, at least a portion of the method being performed by a computing device comprising at least one processor, the method comprising:

detecting that a data storage protection protocol for backing up a virtual machine is switching from a hypervisor native snapshot solution to a continuous data protection solution;

toggling, at a specific toggling time, an input/output tap to switch to the continuous data protection solution, wherein the input/output tap records each of a plurality of write operations performed on the virtual machine upon activation;

querying, at a specific snapshot time after the specific toggling time, the continuous data protection solution to determine a previous capture of data corresponding to differences in the virtual machine from the specific toggling time to the specific snapshot time;

capturing, at the specific snapshot time, an incremental snapshot corresponding to differences in the virtual machine, from a last snapshot time of a last snapshot captured prior to the specific toggling time to the specific snapshot time, that is absent from the previous capture of data, wherein the switching from the hypervisor native snapshot solution to the continuous data protection solution is finalized upon capturing the incremental snapshot; and generating a synthetic snapshot based on a combination of the incremental snapshot captured at the specific snapshot time and a set of at least one snapshot taken prior to the specific toggling time;

wherein the continuous data protection solution synchronizes the specific snapshot time with a matching time such that a last block written as part of the incremental snapshot is the same as a last block written within the continuous data protection solution at the matching time marked within the continuous data protection solution.

2. The computer-implemented method of claim 1, wherein the continuous data protection solution utilizes the input/output tap to send input/output operations to a gateway.

3. The computer-implemented method of claim 1, wherein generating the synthetic snapshot based on the combination of the incremental snapshot captured at the specific snapshot time and the set of at least one snapshot taken prior to the specific toggling time eliminates a requirement to perform a full backup as a condition to switch to the continuous data protection solution.

4. The computer-implemented method of claim 1, wherein the set of at least one snapshot taken prior to the specific toggling time includes at least one full backup.

5. The computer-implemented method of claim 1, wherein generating the synthetic snapshot comprises the hypervisor native snapshot solution querying the continuous data protection solution whether the continuous data protection solution already possesses a set of incremental changes to the virtual machine.

6. The computer-implemented method of claim 2, wherein the gateway creates the synthetic snapshot.

7. The computer-implemented method of claim 6, wherein the gateway sends the synthetic snapshot to a media server.

8. The computer-implemented method of claim 2, wherein the input/output tap begins transmitting, at the specific toggling time, new data written to the virtual machine after the specific toggling time.

9. The computer-implemented method of claim 8, wherein the input/output tap transmits the new data written to the virtual machine without transmitting full data corresponding to a full backup taken prior to the specific toggling time.

10. The computer-implemented method of claim 4, wherein the set of at least one snapshot taken prior to the specific toggling time includes at least one full backup and at least one incremental backup.

11. A system for protecting data, the system comprising:

a detection module, stored in memory, that detects that a data storage protection protocol for backing up a virtual machine is switching from a hypervisor native snapshot solution to a continuous data protection solution;

a toggling module, stored in memory, that toggles, at a specific toggling time, an input/output tap to switch to the continuous data protection solution, wherein the input/output tap records each of a plurality of write operations performed on the virtual machine upon activation;

a capturing module, stored in memory, that:
  queries, at a specific snapshot time after the specific toggling time, the continuous data protection solution to determine a previous capture of data corresponding to differences in the virtual machine from the specific toggling time to the specific snapshot time; and
  captures, at the specific snapshot time, an incremental snapshot corresponding to differences in the virtual machine, from a last snapshot time of a last snapshot captured prior to the specific toggling time to the specific snapshot time, that is absent from the previous capture of data, wherein the switching from the hypervisor native snapshot solution to the continuous data protection solution is finalized upon capturing the incremental snapshot;

a generation module, stored in memory, that generates a synthetic snapshot based on a combination of the incremental snapshot captured at the specific snapshot time and a set of at least one snapshot taken prior to the specific toggling time; and at least one physical processor configured to execute the detection module, the toggling module, the capturing module, and the generation module;

wherein the continuous data protection solution synchronizes the specific snapshot time with a matching time such that a last block written as part of the incremental snapshot is the same as a last block written within the continuous data protection solution at the matching time marked within the continuous data protection solution.

12. The system of claim 11, wherein the continuous data protection solution utilizes the input/output tap to send input/output operations to a gateway.

13. The system of claim 11, wherein the generation module generates the synthetic snapshot based on the combination of the incremental snapshot captured at the specific snapshot time and the set of at least one snapshot taken prior to the specific toggling time at least in part by eliminating a requirement to perform a full backup as a condition to switch to the continuous data protection solution.

14. The system of claim 11, wherein the set of at least one snapshot taken prior to the specific toggling time includes at least one full backup.

15. The system of claim 12, wherein the gateway creates the synthetic snapshot.

16. The system of claim 15, wherein the gateway sends the synthetic snapshot to a media server.

17. The system of claim 12, wherein the input/output tap is configured to begin transmitting, at the specific toggling time, new data written to the virtual machine after the specific toggling time.

18. The system of claim 17, wherein the input/output tap is configured to transmit the new data written to the virtual machine without transmitting full data corresponding to a full backup taken prior to the specific toggling time.

19. The system of claim 14, wherein the set of at least one snapshot taken prior to the specific toggling time includes at least one full backup and at least one incremental backup.

20. A non-transitory computer-readable medium comprising one or more computer-readable instructions that, when executed by at least one processor of a computing device, cause the computing device to:
- detect that a data storage protection protocol for backing up a virtual machine is switching from a hypervisor native snapshot solution to a continuous data protection solution;
- toggle, at a specific toggling time, an input/output tap to switch to the continuous data protection solution, wherein the input/output tap records each of a plurality of write operations performed on the virtual machine upon activation;
- query, at a specific snapshot time after the specific toggling time, the continuous data protection solution to determine a previous capture of data corresponding to differences in the virtual machine from the specific toggling time to the specific snapshot time;
- capture, at the specific snapshot time, an incremental snapshot corresponding to differences in the virtual machine, from a last snapshot time of a last snapshot captured prior top the specific toggling time to the specific snapshot time, that is absent from the previous capture of data, wherein the switching from the hypervisor native snapshot solution to the continuous data protection solution is finalized upon capturing the incremental snapshot; and
- generate a synthetic snapshot based on a combination of the incremental snapshot captured at the specific snapshot time and a set of at least one snapshot taken prior to the specific toggling time;
- wherein the continuous data protection solution synchronizes the specific snapshot time with a matching such that a last block written as part of the incremental snapshot is the same as a last block written within the continuous data protection solution at the matching time marked within the continuous data protection solution.

* * * * *